(12) United States Patent
Henry

(10) Patent No.: US 8,025,219 B2
(45) Date of Patent: Sep. 27, 2011

(54) DUAL PURPOSE CARD READER

(75) Inventor: Chris Henry, Phoenix, AZ (US)

(73) Assignee: Hypercom Corporation, Scottsdale, AZ (US)

( * ) Notice: Subject to any disclaimer, the term of this patent is extended or adjusted under 35 U.S.C. 154(b) by 738 days.

(21) Appl. No.: 11/736,302

(22) Filed: Apr. 17, 2007

(65) Prior Publication Data

US 2008/0011850 A1    Jan. 17, 2008

Related U.S. Application Data

(60) Provisional application No. 60/792,829, filed on Apr. 17, 2006.

(51) Int. Cl.
*G06K 5/00* (2006.01)
(52) U.S. Cl. ........................................ 235/380; 235/383
(58) Field of Classification Search ................... 235/380, 235/383
See application file for complete search history.

(56) References Cited

U.S. PATENT DOCUMENTS

| 6,983,882 B2 | 1/2006 | Cassone |
| 2004/0188519 A1 | 9/2004 | Cassone |

FOREIGN PATENT DOCUMENTS

| EP | 0959424 | 11/1999 |
| EP | 1037446 | 9/2000 |
| EP | 1457919 | 9/2004 |

OTHER PUBLICATIONS

Examination Report for corresponding Australian Patent Application No. 2007237929, issued Jan. 8, 2010, 2 pages.
Examination Report for corresponding New Zealand Patent Application No. 572530, issued Mar. 29, 2010, 1 page.
Written Opinion for corresponding Singapore Patent Application No. 200807684-6, issued Mar. 23, 2009, 7 pages.
Examination Report for corresponding Malaysian Patent Application No. PI20084124, issued May 29, 2009, 3 pages.
Examination Report for corresponding Singapore Patent Application No. 200807684-6, issued Nov. 24, 2010, 6 pages.
Office Action for corresponding Chinese Patent Application No. 200780013759.1, issued Jun. 29, 2010, 10 pages.
Office Action for corresponding Mexican Patent Application No. MX/a/2008/013316, issued Sep. 3, 2010, 5 pages.
Office Action for corresponding Mexican Patent Application No. MX/a/2008/013316, issued Feb. 1, 2011, 3 pages.
Office Action for corresponding Chinese Patent Application No. 200780013759.1, issued Feb. 21, 2011, 3 pages.
Supplementary Search Report and Preliminary Opinion for corresponding European Patent Application No. 07760768.7, issued Apr. 6, 2011, 3 pages.

*Primary Examiner* — Michael G Lee
*Assistant Examiner* — Kristy A Haupt
(74) *Attorney, Agent, or Firm* — Snell & Wilmer L.L.P.

(57) ABSTRACT

The present invention provides for a compact, portable POS terminal through the co-location of a magnetic card slot and a smart card entry slot. In one embodiment, the smart card slot is positioned within a portion of the magnetic card slot. The POS terminal also accommodates contactless instrument readers and optionally includes features for electronic signature capture, user display interaction, multi-tasking capabilities, check reading and age and identity verification.

5 Claims, 4 Drawing Sheets

DUAL PURPOSE CARD READER

CROSS-REFERENCE TO RELATED APPLICATION

This application claims priority to and benefit of U.S. Provisional Application No. 60/792,829, entitled "Dual Purpose Card Reader" and filed on Apr. 17, 2006, which is hereby incorporated by reference in its entirety.

FIELD OF INVENTION

The present invention relates, generally, to a point of sale ("POS") terminal that is compact, portable and capable of reading both magnetic stripe cards and smart cards, and more particularly to a POS terminal having a magnetic stripe reader and a smart card reader that are co-located.

BACKGROUND OF THE INVENTION

Point of service ("POS") terminals enable convenient electronic payment for many products and services. Consumers holding cards associated with a charge, credit, debit, or loyalty account may pay for a purchase simply by utilizing a magnetic stripe card, a smart card, or a contactless card. A POS terminal reads information from a magnetic stripe card when the magnetic stripe is swiped through a slot in the POS terminal. A POS terminal reads information from smart cards when the smart card is inserted into a separate opening in a POS terminal. In addition, POS terminal may read contactless cards by utilizing a separate antenna device that detects and retrieves information from contactless cards.

Presently known POS terminals typically include, inter alia, a magnetic stripe reader, a keypad for entry of a personal identification number ("PIN"), and a user display. Conventional POS terminals communicate with a central computer to authorize and settle sales transactions. Terminals often include peripheral devices such as printers, bar code readers or PIN entry pads. Use of such known POS terminals typically requires that the user orient the magnetic stripe on a card to correspond to the position of the magnetic stripe reader head within the card track or slot on the terminal. Some POS terminals can read smart cards either instead of, or in addition to, magnetic stripe cards. If the POS terminals supports reading both magnetic stripe cards and smart cards, then an external extraction device may be used to read the smart card. Such an extraction device would connect to the POS terminal via a socket or similar interface. Other POS terminals may have an opening for receiving smart cards that is separate from the magnetic card slot. The smart card would be inserted into the opening. Separate magnetic card slot and smart card openings result in a POS terminal that is too large to be used as a portable, hand-held device.

Accordingly, in order to create a POS terminal that is compact in size and can be utilized as a hand-held, portable POS terminal, it has been necessary to choose to either support magnetic stripe cards or smart cards. Supporting both card formats, would lead to a larger POS terminal that is less portable and not easily utilized as a hand-held POS terminal.

Accordingly, there is a need for a POS terminal that accommodates multiple card formats, such as magnetic stripe and smart cards, and still results in a compact, hand-held POS terminal.

SUMMARY OF THE INVENTION

The present invention facilitates convenient POS terminal transactions by providing a dual purpose card reader that may be used in portable, hand-held POS terminals and other compact POS terminals. By including a dual purpose card reader with a magnetic stripe reader and a smart card reader that are co-located, a POS terminal may be produced that is compact, and yet capable of supporting magnetic stripe cards and smart cards. When a magnetic stripe card is utilized, the card may be swiped such that it passes through the slot and by the reader head. When a smart card is utilized, the smart card may be inserted through the smart card entry slot, passing through the side wall of the magnetic card slot, and into the smart card acceptance device, thereby allowing the smart card and the smart card acceptance device to communicate. The smart card will pass through the magnetic card slot at an angle that is approximately perpendicular to the magnetic card slot.

Co-locating the magnetic card slot and the smart card entry slot allow for a more compact POS terminal design that is easy to use.

Other features of various embodiments of the present invention may include or support electronic signature capture, an interactive screen, multi-tasking capabilities, age and identity verification, program or account enrollment, account status and balance inquiries, payroll and government check reading, and medical or other insurance claim transactions. The present invention may be used with various types of accounts including credit, debit, charge, and loyalty programs and may also accommodate payment by promotion or gift cards, prepaid cards, payroll checks and government checks.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

DETAILED DESCRIPTION

Figure 1:
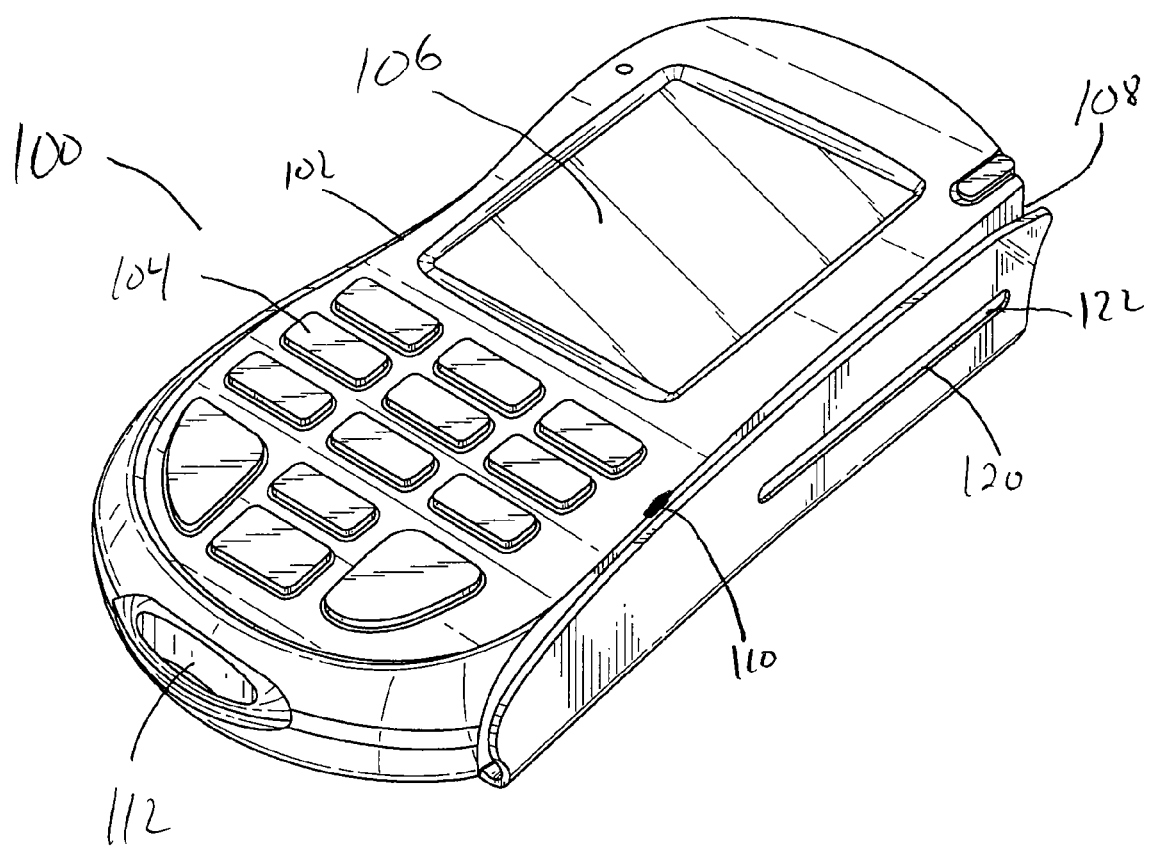
FIG. 1 is a perspective view of an exemplary POS terminal according to one embodiment of the present invention.

The detailed description of exemplary embodiments of the invention herein makes reference to the accompanying drawings, which show exemplary embodiments by way of illustration and the best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the system (and components of the individual operating components of the system) may not be described in detail herein. It should be noted that many alternative or additional functional relationships or physical connections may be present in a practical system.

A point of sale ("POS") terminal according to various embodiments of the present invention includes a magnetic stripe reader, a smart card reader, various electronic circuits for processing a financial transaction, an interactive display for presenting and receiving input of transaction information, a keypad including numeric and function keys, and a housing containing the circuits, display and keypad. The POS terminal may also be used with a contactless card reader, bar card reader, biometric reader, or other input devices, and thus may provide for a variety of interfaces. Wireless capabilities may also be incorporated into the present invention to promote portability. Other periphery devices for use with the POS terminal may include printers, additional displays, PIN entry pads, alphanumeric keyboards, voice prompt systems, and signature capture devices. The POS terminal may be a stand alone unit or may be integrated into an electronic cash register ("ECR"), vending machine or a self check-out kiosk and the like.

In an exemplary POS transaction, the POS terminal facilitates payments by extracting account information from a user's transaction instrument (e.g., when a user swipes a credit card or inserts a smart card), receiving authentication input, constructing an authorization message, and communicating the authorization message to a host computer to authorize a financial transaction. As used herein, the term "user" includes a consumer, cardholder, merchant, and merchant temporarily in possession of a consumer's transaction card. Cardholder authentication may be accomplished using a PIN number, signature, voice command, biometric input, encrypted transaction instrument data, or any other suitable input. The host computer performs normal authorization procedures and returns one of an authorization and a rejection message. In performing an "on-line" transaction, after the transaction is consummated, the POS terminal communicates the relevant details of the transaction to be stored on the host computer system. While in performing an "off-Line" transaction, the terminal may approve or decline based on tables or card date or other data, and later forward transaction data to the payment manager host computer. The POS terminal further communicates with the payment manager host computer to reconcile accounts at the end of a predetermined business cycle (e.g., at the end of each day). Communications between the POS terminal and a host computer may be conducted over any suitable network now known or later developed. As used herein, the term "network" shall include any electronic communications means which incorporates both hardware and software components of such. Exemplary networks or communication channels include a telephone network, an extra-net, an intranet, Internet, online communications, satellite communications, off-line communications, wireless communications, transponder communications, local area network (LAN), wide area network (WAN), networked or linked devices, and/or any suitable communication or data input modality.

Figure 4:
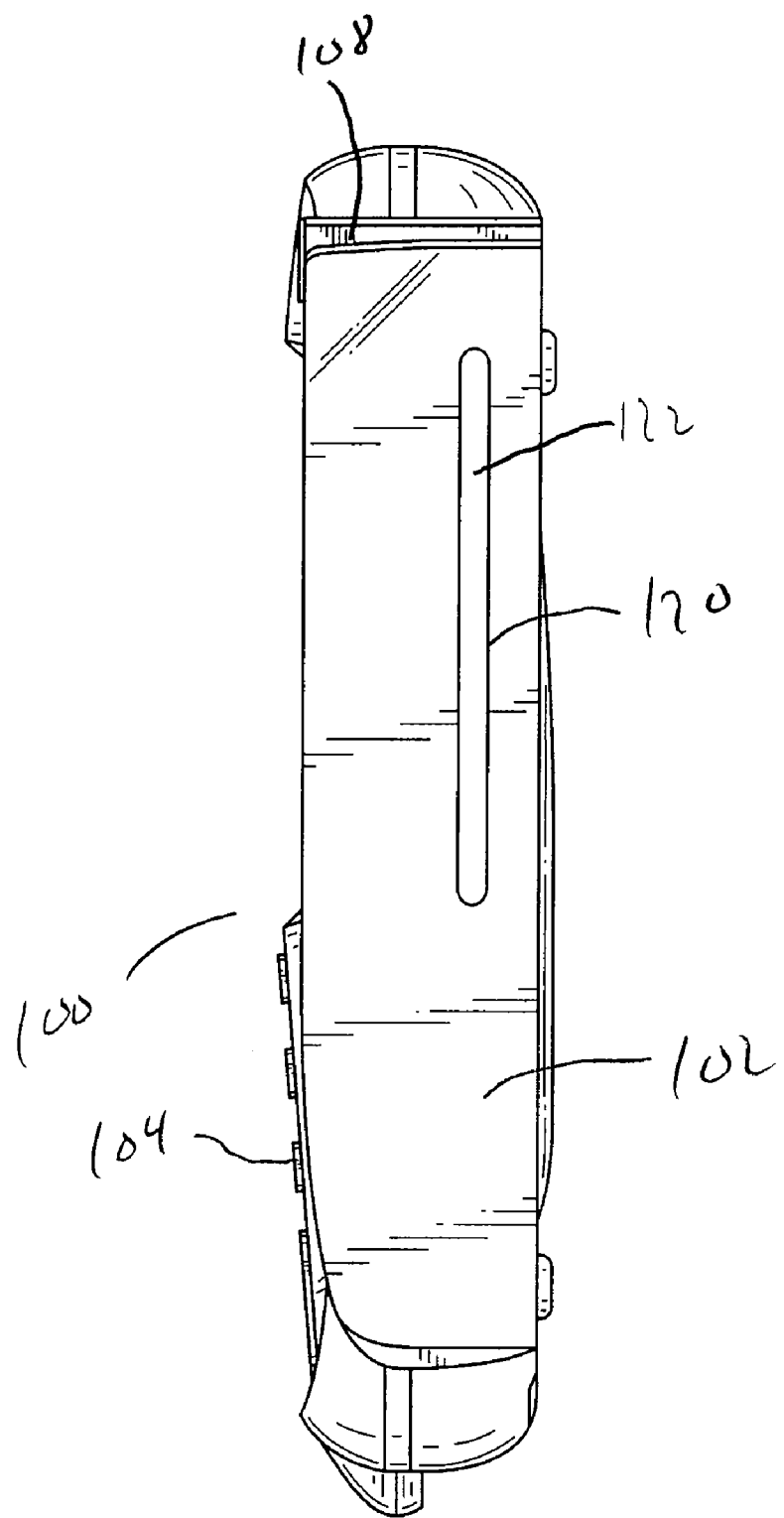
FIG. 4 is a side view of the exemplary POS terminal of FIG. 1.

Referring now to FIGS. 1 and 4, an exemplary embodiment of the invention is illustrated including a POS terminal 100 having a housing 102, a key pad 104, an interactive display 106, a magnetic card slot 108, a magnetic stripe reader head 110, and a smart card reader 120. Housing 102 houses various components of POS terminal 100 including basic components not shown here, such as a power supply circuit, internal clock, microcontroller or microprocessor, ROM, RAM, lights, and other suitable hardware for communicating with a host computer, and inputting, processing, transferring or displaying transaction data.

Housing 102 includes magnetic card slot 108 formed therein and houses reader head 110 positioned along slot 108. Slot 108 includes two sidewalls for guiding a user's transaction card drawn past reader head 110 to facilitate extraction of card data from a magnetic stripe on the card. An opening 122 for smart card reader 120 is positioned such that a user's smart card is inserted into opening 122, through slot 108, and into smart card reader 120. In accordance with one embodiment of the present invention, smart card opening 122 is positioned offset from reader head 110, such that reader head 110 is located on a part of slot 108 away from smart card opening 122. The invention contemplates any orientation or placement of magnetic head 110 and smart card opening 122 such that magnetic card slot 108 and smart card opening 122 are co-located, and such their orientation and location facilitates reading a magnetic stripe card in one instance, and reading a smart card at a separate time. For example, reader head 110 may be positioned on the same side of slot 108 as smart card opening 122, or, instead, be positioned on the opposite side of the slot from smart card opening 122. In accordance with one embodiment of the present invention, reader head 110 is offset from smart card opening along the length of card slot 108, and may be located on either side of smart card opening 122. Offsetting reader head 110 and smart card opening 122 along card slot 108 reduces interference and/or enables a user to more smoothly draw a card through card slot 108 or insert a card into opening 122. Reader head 110 and smart card opening 122 may be directly opposed in alternative embodiments.

Reader head 110 may be positioned so as to protrude from, be flush-mounted with, or be recessed into the sidewalls of card slot 108. Similarly, card slot 108 need not include sidewalls, but may include, instead, any feature suitable for guiding a card past reader head 110. Exemplary alternative card slot features include a slot, ledge, pin, tab, projection, recess, and the like. A mechanical feed or feed-return device may be used to automatically draw a card inserted into card slot 108 past reader head 110.

Smart card opening 122 may be positioned so as to protrude from, be flush-mounted with, or be recessed into the sidewalls of card slot 108. A mechanical feed or feed-return device may be used to automatically draw a card inserted into smart card opening 122, through slot 109, and into smart card reader 120.

Figure 2:
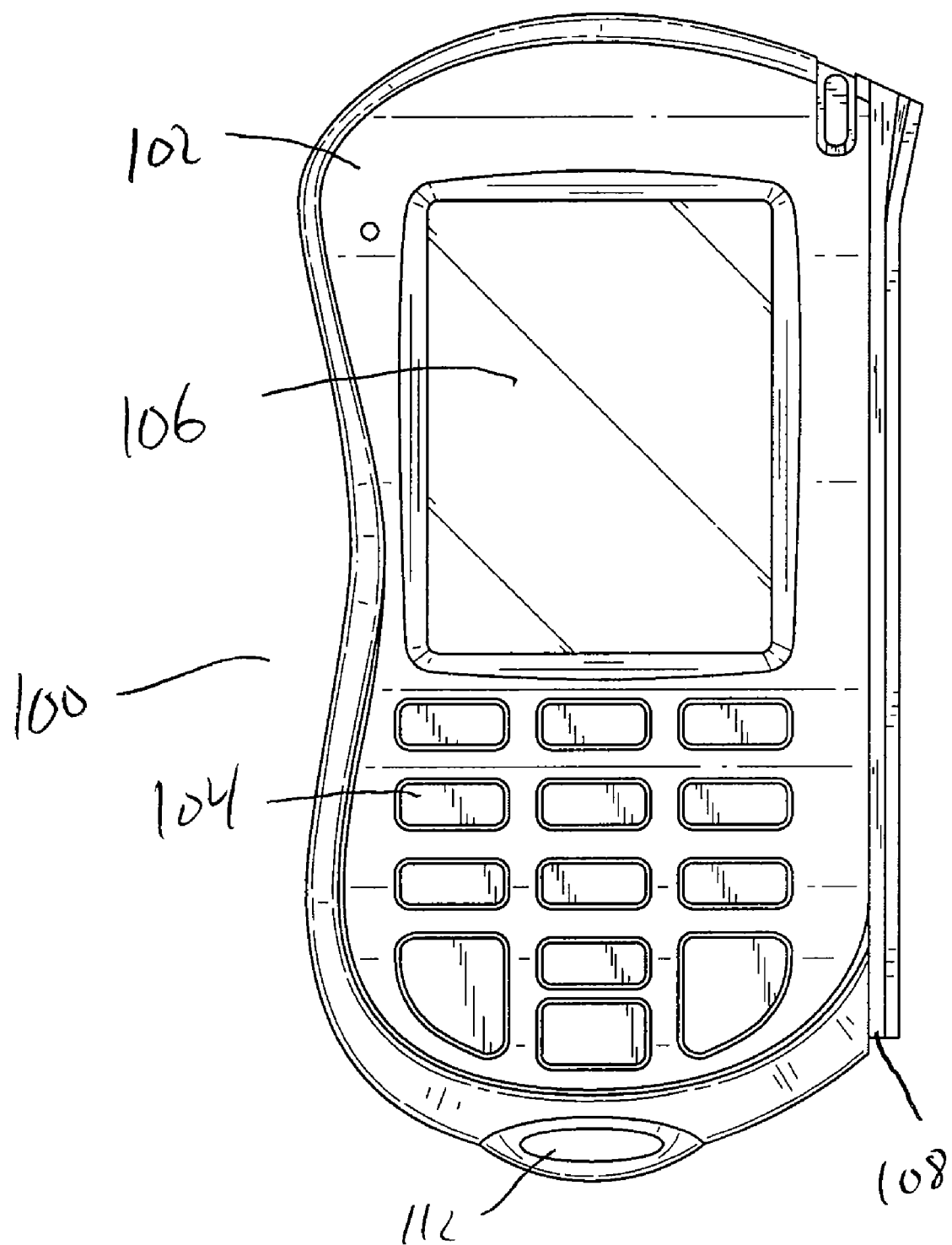
FIG. 2 is a top view of the exemplary POS terminal of FIG. 1.

With reference to FIG. 2, housing 102 may include a lanyard opening 112 for connecting a lanyard or similar cord to housing 102. In this manner, a user may carry the POS terminal on their belt, backpack, and the like. In accordance with one embodiment of the present invention, housing 102 may comprise a zinc alloy chassis, resulting in a highly portable, compact POS terminal. In addition, modular or peripheral devices may connect to housing 102, either via a socket or through a wireless connection (not illustrated). Exemplary modular peripheral devices include contactless transaction instrument readers, radio frequency readers, infrared and wireless communications devices, supplemental magnetic stripe readers, PIN keypads, bar code scanners, printers, modems, telephone handsets, biometric scanners, voice command input devices and the like. Similarly, any peripheral device or capability now known or later developed may be integrated into or associated with POS terminal 100. Additionally, housing 102 may include features such as a latch, clip, or slot to facilitate docking, tabletop, pedestal or stand mounting.

Keypad 104 comprises an alphanumeric keypad including keys numbered zero through nine for entry of PIN numbers. Keypad 104 may also include any number of function keys, such as, for example, keys for canceling a transaction, specifying the type of transaction instrument, selecting whether to print a receipt, confirming a charge amount, or for any other relevant feature. Alphanumeric and/or function keys on keypad 104 may be separately movable as with a conventional keyboard, or may be displayed on an interactive surface that responds to pressure, static, or any other suitable user input or action. In accordance with one embodiment of the present invention, keypad 104 is integrated into interactive display 106 as a series of on-screen interactive icons. Exemplary function keys or icons include: cancel, enter, clear, print, reset, power, debit, credit, cash back, additional transaction selection, preset dollar amounts for cash back, and the like.

With continued reference to the embodiment shown in FIG. 1, interactive display 106 serves to display transaction information and with an optional touch screen, may also receive user input such as a customer's signature. Various embodiments include electronic signature capture, enabling user's to electronically authorize a transaction by passing a stylus or pen over the display much the same as signing a conventional paper receipt. Replaceable screen protectors protect display 106 from wear by the stylus. Display 106 may present advertising or interactive messages such flashing or moving messages notifying users of merchant membership programs, sales, upcoming events and the like. In alternative embodiments, display 106 is not interactive but merely displays transaction data while providing no signature capture, interactive icons or other on-screen user input capabilities. In additional alternative embodiments, POS terminal 100 does not include any type of display 106, for example, when POS terminal 100 is coupled to a cash register including a display. Alternatively, a stand alone POS terminal 100 need not have any form of display 106 to facilitate a transaction.

Figure 3:
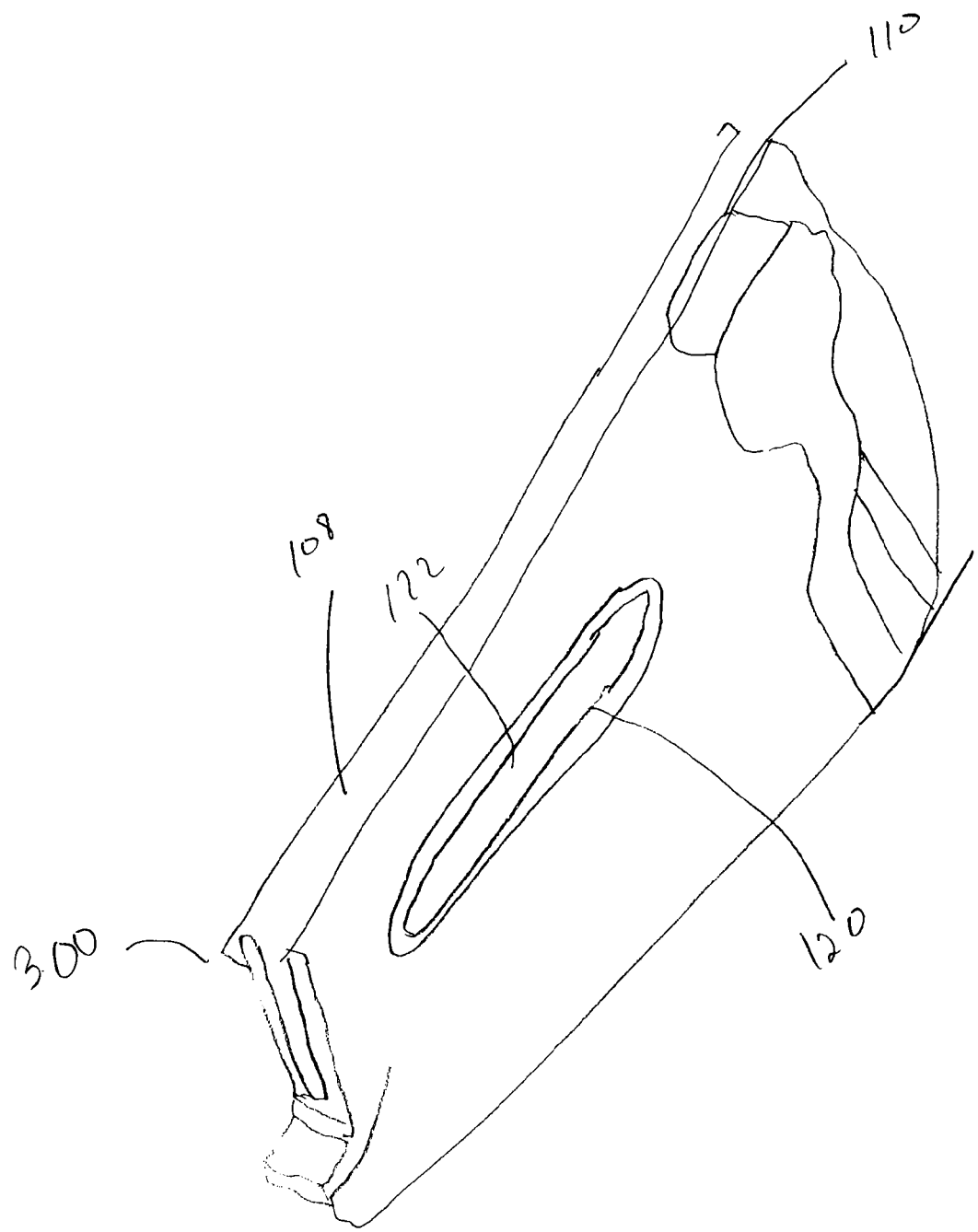
FIG. 3 is a perspective view of an exemplary dual purpose card reader assembly.

With reference to FIG. 3, an exemplary dual card reader 300 is illustrated. Dual card reader assembly 300 comprises one or more reader heads 110 positioned along slot 108. Dual card reader assembly 300 further comprises a smart card reader 120 with opening 122. Opening 122 for smart card reader 120 is positioned such that a user's smart card is inserted into opening 122, through slot 108, and into smart card reader 120. In accordance with one embodiment of the present invention, smart card opening 122 is positioned offset from reader head 110, such that reader head 110 is located on a part of slot 108 away from smart card opening 122. The invention contemplates any orientation or placement of magnetic head 110 and smart card opening 122 such that magnetic card slot 108 and smart card opening 122 are co-located, and such their orientation and location facilitates reading a magnetic stripe card in one instance, and reading a smart card at a separate time. For example, reader head 110 may be positioned on the same side of the slot as smart card opening 122, or, instead, be positioned on the opposite side of the slot from smart card opening 122. In accordance with one embodiment of the present invention, reader head 110 is offset from smart card opening along the length of card slot 108, and may be located on either side of smart card opening 122. Offsetting reader head 110 and smart card opening 122 along card slot 108 reduces interference and/or enables a user to more smoothly draw a card through card slot 108 or insert a card into opening 122. Reader head 110 and smart card opening 122 may be directly opposed in alternative embodiments.

In one embodiment of the invention, a transceiver disposed in POS terminal 100 and associated programming modules support wireless communication between POS terminal 100 and a host computer. This wireless communication enables the POS terminal to be portable and even held in a user's hand. The user can carry the POS terminal with them as they carry out their business.

One embodiment of the invention supports age and identity verification by extracting user data from a user's transaction instrument, requesting authentication input, and verifying the user data and authentication input with user data stored on the host system of the transaction instrument issuer. Age and identity verification may likewise be performed using any appropriate transaction instrument data, host system data or user supplied data.

One embodiment of the invention supports payroll check and government check reading and/or cashing. For example, the POS terminal facilitates the capture of routing and account numbers, and any other relevant information from bar codes or other machine readable indicia printed or otherwise accessible on such checks. Thus, a consumer may present such checks for immediate electronic verification and drawing of funds from the check issuer's account for use in payment at a POS terminal. In embodiments that include a cash return device, a consumer may receive any remaining balance of the check value as cash.

In one embodiment of the invention, IP and/or USB ports enable connectivity of the POS terminal with a docking station, printer device, keyboard, personal computer, or with additional POS terminals. Additionally, the POS terminal may support both Ethernet and modem connectivity capabilities. Redundant communications connectivity capabilities serve to reduce or eliminate the impact of temporary network failures by automatically reestablishing communications with a host system using a backup communications channel. For example, if a local internet network hub fails, the POS automatically dials the appropriate host system using a back-up modem. Additional wireless communication capabilities enable portable use of the POS terminal. For example, a salesperson may carry a wireless POS terminal on his or her belt for assisting customer's with showroom purchases without the need to relocate to a cashier's desk Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." Further, no element described herein is required for the practice of the invention unless expressly described as "essential" or "critical."

What is claimed is:

1. A dual purpose card reader assembly comprising:
   a card swipe slot for dynamically orienting a transaction card having a magnetic stripe;
   a first magnetic stripe reader head disposed along said slot for reading said magnetic stripe on said card;
   a second magnetic stripe reader head disposed along said slot for reading said magnetic stripe on said card, wherein said second magnetic stripe reader head is longitudinally offset from said first magnetic stripe reader head; and
   a smart card reader, for receiving a smart card having an integrated circuit, wherein said smart card reader is co-located with said card swipe slot.

2. The dual purpose card reader assembly of claim 1, wherein the first and second magnetic stripe reader heads are longitudinally offset from the smart card reader.

3. A point-of-service terminal comprising:

a housing;

a card swipe slot associated with said housing, for dynamically orienting a transaction card having a magnetic stripe;

a first magnetic stripe reader head disposed along said slot for reading said magnetic stripe on said card;

a second magnetic stripe reader head disposed along said slot for reading said magnetic stripe on said card, wherein said second magnetic stripe reader head is longitudinally offset from said first magnetic stripe reader head; and a smart card reader associated with said housing, for receiving a smart card having an integrated circuit, wherein said smart card reader is co-located with said card swipe slot.

4. The point-of-service terminal of claim 3, wherein the first and second magnetic stripe reader heads are longitudinally offset from the smart card reader.

5. A method of extracting financial transaction information at a point-of-service terminal, the method comprising:

providing a first magnetic stripe reader head;

providing a second magnetic stripe reader head, wherein said second magnetic stripe reader head is longitudinally offset from said first magnetic stripe reader head;

providing a card swipe slot to facilitate drawing a magnetic stripe on a transaction card past the first and second magnetic stripe reader heads;

providing a smart card reader to facilitate receiving a smart card such that information can be read by the smart card reader, wherein the smart card reader is co-located with the card swipe slot.

* * * * *